Aug. 25, 1959 KIYO TOMIYASU 2,901,698
MICROWAVE FREQUENCY METER
Filed Sept. 21, 1955

TEM MODE

TE₁,₁ MODE

INVENTOR
KIYO TOMIYASU
BY
ATTORNEY

United States Patent Office 2,901,698
Patented Aug. 25, 1959

2,901,698

MICROWAVE FREQUENCY METER

Kiyo Tomiyasu, Menlo Park, Calif., assignor to Sperry Rand Corporation, a corporation of Delaware Application September 21, 1955, Serial No. 535,668

12 Claims. (Cl. 324—78)

The present invention relates to broad band microwave frequency meters.

There are many types of high frequency devices known in the art for providing an indication of the frequency of oscillations of electromagnetic energy at an unknown microwave frequency. In general, such devices are of high-Q and narrow bandwidth and, therefore, not as versatile for frequency measurements as might be desired.

Therefore, it is an object of the present invention to provide a low-Q frequency measuring device capable of quickly detecting the frequency of microwave oscillations over an extremely broad frequency band.

It is a further object of the present invention to provide a frequency measuring device as aforedescribed for readily providing an unambiguous indication of frequency over an unusually large frequency range.

The foregoing and other objects and advantages of the present invention, which will become more apparent from the accompanying drawings and the detailed description thereof, are attained by providing an electromagnetic transmission line for propagating a first mode of energy over a wide band of microwave frequencies. Adjustable means are provided along the transmission line for converting a portion of the energy in a section of said line to a different mode whenever the frequency of input energy supplied to the transmission line reaches a predetermined relationship relating to the state of adjustment of said last-mentioned means. Further means are provided along the transmission line for selectively absorbing the further mode when generated, other means being provided for detecting the output power from the transmission line. The frequency of incoming energy supplied to the transmission line is determined by noting the state of adjustment of the mode converting means at a time when there is a dip in the detected power, each state of adjustment corresponding to a different lower frequency limit at which the aforementioned section of transmission line is capable of propagating the further mode of electromagnetic energy. Apparatus as aforedescribed may be designed for frequency measurements over a band of frequencies from one to twelve kilomegacycles, for example.

Referring to the drawings.

Figure 1:
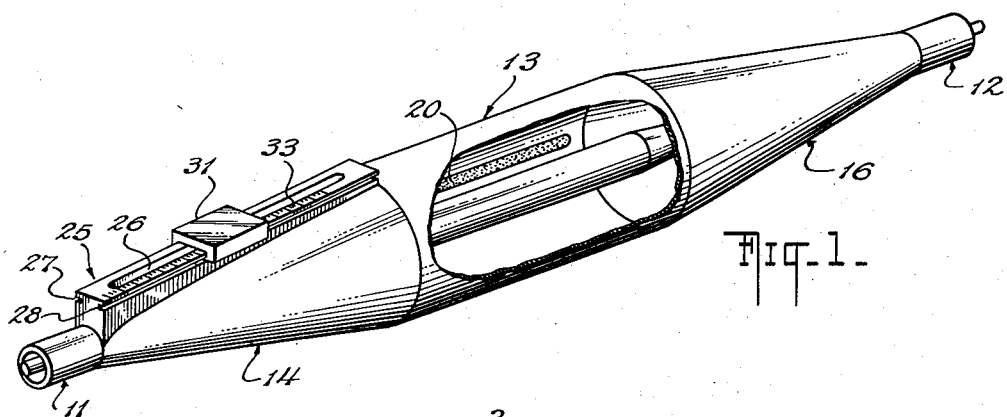
Fig. 1 is a perspective view, partially broken away, of a microwave frequency measuring device in accordance with the present invention.
Figure 2:
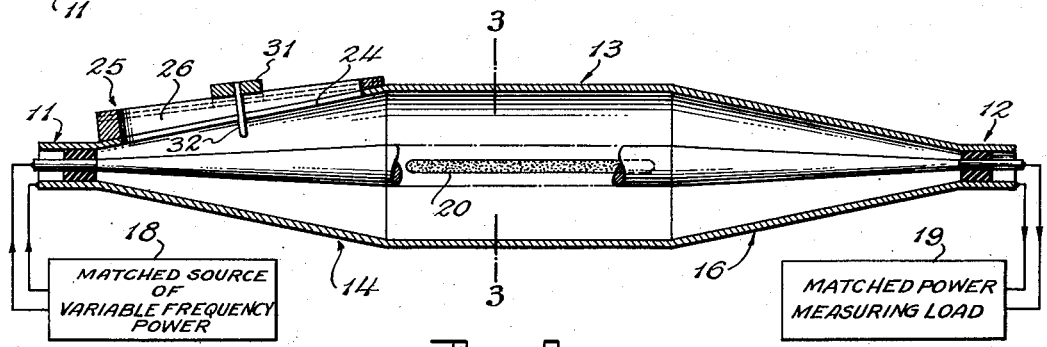
Fig. 2 illustrates a frequency measuring system including a sectional view of the device illustrated in Fig. 1 along the longitudinal axis thereof.
Figure 3:
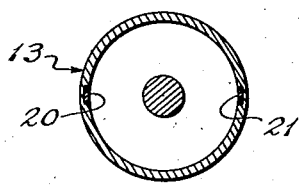
Fig. 3 is a cross-sectional view of the device taken along line 3—3 in Fig. 2.

Referring to Figs. 1 and 2, the frequency measuring device comprises a pair of coaxial line terminal or end sections 11 and 12 of the same size, an intermediate section of coaxial line 13 of appreciably larger size therebetween, and tapered sections 14 and 16 coupling the terminal sections 11 and 12, respectively, to the intermediate section 13. The sections 11—13 should have the same characteristic impedance, the sections 14 and 16 having tapered inner and outer conductors for providing smooth transitions from the larger section 13 to the smaller sections 11—12 of coaxial line.

The coaxial line terminal section 11 is coupled to a matched source 18 of variable frequency electromagnetic wave energy. The source 18 is adapted to supply the coaxial line section 11 with dominant TEM mode coaxial line energy at any frequency within a wide band of microwave frequencies from one to twelve kilomegacycles, for example. Coaxial line sections 11 and 12 should be restricted in size so that there will be substantially no propagation of energy therein for higher order coaxial line modes at any frequency within the frequency measuring band of the device.

The coaxial line terminal section 12 is coupled to a suitable matched power measuring load 19 such as a bolometer or a crystal detector and a suitable meter, not shown. Such a load should provide a visual indication of the amount of microwave power reaching the right-hand end of coaxial line section 12.

Figure 4:
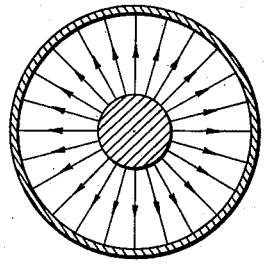
Fig. 4 is a cross-sectional view of a coaxial line for indicating the electric vectors of a dominant TEM mode therein.
Figure 5:
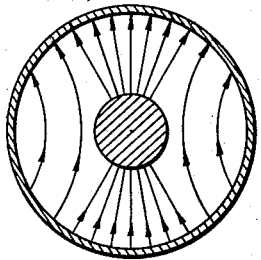
Fig. 5 is a cross-sectional view of a coaxial line for indicating the configuration of the electric vectors of a higher order $TE_{11}$ coaxial line mode.

The coaxial line section 13 is made of sufficient size so that this section of line will propagate both the dominant TEM mode of energy as well as a higher order $TE_{11}$ mode of energy at any frequency within the aforementioned frequency band of the device. The configurations of the electric vectors for coaxial line modes as aforedescribed are illustrated in Figs. 4 and 5. A pair of longitudinal slots 20 and 21 are provided in diametrically opposite regions of the outer conductor of coaxial line section 13 for selectively attenuating $TE_{11}$ mode energy without attenuation of the TEM mode energy. The slots 20 and 21 may be filled with a microwave absorbing material such as polyiron.

The coaxial line sections 11 and 12 are designed by suitable choice of the sizes of the inner and outer conductors thereof to be just below cut-off for $TE_{11}$ mode propagation at the highest frequency within the bandwidth of the measuring device. Therefore, the left-hand end of section 14 is just below cut-off for $TE_{11}$ mode propagation at such a frequency, a cross-sectional region just to the right of the left-hand end being just above cut-off for the highest frequency within the band of frequencies to be measured. The dimensions of the inner and outer conductors of section 14 gradually increase from left to right with the cut-off frequency for $TE_{11}$ mode propagation gradually decreasing until, at the right-hand end of section 14 the dimensions are above cut-off for $TE_{11}$ mode propagation at the lowest frequency within the aforementioned band of frequencies.

The tapered line section 14 has a longitudinal slot 24 through the outer conductor thereof along a region extending intermediate the ends of section 14 from a point whereat the dimensions of section 14 are just sufficient for the $TE_{11}$ mode at the highest frequency to be determined to a point whereat the dimensions of section 14 are just sufficient for the $TE_{11}$ mode at the lowest frequency to be determined by the measuring device. A guide or track member 25 having a longitudinal slot therethrough in alignment with slot 24 is provided in fixed relationship along the coaxial line section 14. The member 25 has a pair of grooves 27 and 28 along opposite sides thereof for guiding a slidable element 31 along the member 25 from one end to the other. Element 31 supports a probe 32 for extension through slots 26 and 24 into the interior of the coaxial line section 14 for converting a portion of the TEM mode energy therein to TE$_{11}$ mode energy when in a proper state of adjustment. A scale 33 is provided along member 25 for relating the position of probe 32 along section 14 to the microwave frequency for which the cross-sectional dimensions of section 14 at the transverse plane of the probe are just above cut-off for TE$_{11}$ mode propagation.

The probe 32 is positioned in 90° relationship with respect to the longitudinal slots 20 and 21 in the intermediate section of coaxial line 13. The guide member 25 is tapered or inclined as illustrated in Fig. 2 so that the depth of penetration of probe 32 into coaxial line section 14 bears a constant ratio to the radial distance between the inner and outer conductors of section 14 regardless of the position of the probe longitudinally of section 14. The probe should be guided along an incline for maintaining a substantially constant magnitude of reflection coefficient for the probe over the frequency band of the device for desired mode energy propagation.

In operation, electromagnetic energy at any unknown microwave frequency within the frequency band of the measuring device is propagated in the dominant TEM coaxial line mode with a minimum of attenuation and no appreciable reflection from the input section 11 to the output section 12. The currents in the walls of the outer coaxial line conductors for such a mode are such that no appreciable current is intersected by the longitudinal slot 24 in line section 14 nor by the slots 20 and 21 in the outer conductor of the intermediate coaxial line section 13.

If probe 32 is adjusted along coaxial line section 14 to a position whereat the section is above cut-off for TE$_{11}$ mode propagation, part of the TEM mode energy will be converted to TE$_{11}$ mode energy and a combination of the TEM and TE$_{11}$ modes will propagate through the remaining portion of section 14 to the right of probe 32 and into the intermediate section 13 of coaxial line. The conductor wall currents for TE$_{11}$ mode propagation are in such a direction that they will be intercepted by the slots 20 and 21 in the intermediate section 13 so that TE$_{11}$ mode power is absorbed by the polyiron within the aforementioned slots. Thus, part of the power originally supplied by the source 18 is absorbed so that there will be reduction in the power indicated by the power measuring load 19.

The probe 32 should be initially located in the smallest cross-sectional region of the tapered section 14 at the beginning of a frequency measurement. As the probe 32 is moved slowly toward regions of larger cross-section of coaxial line section 14, it will eventually reach a position whereat the TE$_{11}$ mode of energy at the unknown frequency can be propagated. At this time, a dip in the power indicated by the measuring load 19 will occur and the frequency of the microwave energy can be determined from the position of the element 31 in relation to the scale 33 upon the guide member 25.

Although the slots 20 and 21 have been illustrated as being positioned in the outer conductor of coaxial line section 13, it is evident that similar results to those obtained above could be accomplished by the location of longitudinally extending slots along the inner conductor of section 13. In lieu of slots, any other mode discrimination means known in the art for selectively absorbing the TE$_{11}$ mode without affecting the TEM mode, could be employed along the intermediate section of coaxial line 13.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. High frequency apparatus, including a transmission line section for propagating electromagnetic energy in a first mode over a wide band of microwave frequencies, means adjustable to different positions along said transmission line section for converting a portion of said energy into a different mode as a function of frequency and position, said transmission line section being above cut-off for any frequency throughout said frequency band for said first mode and having a gradually varying cut-off frequency from one end to the other for said different mode so as to be slightly above cut-off near one end thereof for said different mode at the highest frequency within said band and slightly above cut-off at the other end thereof for said different mode at the lowest frequency within said band, said adjustable mode converting means being regulatable along said transmission line section to a location at which said transmission line section is just above cut-off for propagation of energy in said different mode at a particular frequency within said band.

2. High frequency apparatus as set forth in claim 1, further including a further transmission line section having an input end and an output end, the input end of said further transmission line section being coupled to said first-mentioned transmission line section for receiving microwave output energy therefrom, said further transmission line section being adapted to propagate both said first and second modes throughout said frequency band, and means along said further transmission line section for discriminating between said first and second modes.

3. High frequency apparatus as set forth in claim 2, wherein said discriminating means comprises microwave energy absorbing means at predetermined locations along said further transmission line section for attenuating said second mode without attenuation of said first mode.

4. High frequency apparatus as set forth in claim 3, further including means coupled to said further transmission line section for providing an indication of the power at the output end thereof, and indicator means in combination with said mode converting means along the first-mentioned transmission line section for indicating the position of said mode converting means for each frequency within said band of frequencies at which said first-mentioned transmission line section is just above cut-off.

5. A microwave frequency meter, comprising a first section of electromagnetic wave energy transmission line for substantially reflectionless propagation of microwave energy over a wide frequency range in a first predetermined mode, a second section of electromagnetic wave energy transmission line coupled to said first transmission line section and substantially matched thereto for substantially reflectionless propagation of said predetermined mode over said frequency range substantially without attenuation, means coupled to said second section of transmission line for generation of microwave energy in a different mode from said first mode, said last-named means being adjustable for substantially excluding generation of said different mode for frequencies below any particular frequency within said range as a function of the state of adjustment of said means, a further section of transmission line coupled to said second section, said further section being adapted for substantially reflectionless propagation of energy in both of said modes throughout said frequency range, means along said further section of transmission line for selectively attenuating said further mode without attenuating said first mode, and means coupled to said further section for providing an indication of the microwave output power from said further section.

6. A coaxial line frequency meter for determining the wavelength of electromagnetic energy throughout a wide range of microwave frequencies, comprising a transmission line section of coaxial line having an inner conductor and an outer conductor of gradually increasing diameter from a first to a second end thereof for substantially reflectionless propagation of dominant coaxial line electromagnetic TEM mode energy within said range of frequencies, means adjustably located along said section of coaxial line for converting a portion of said dominant mode energy to higher order coaxial line electromagnetic mode energy, a region adjacent the first end of said coaxial line section being dimensioned so as to be just above cut-off for said higher order mode energy at the highest frequency in said range of microwave frequencies and well below cut-off for said higher order mode energy at the lowest frequency in said range of microwave frequencies, the second end of said coaxial line section being dimensioned so as to be just above cut-off for said higher order mode energy at the lowest frequency in said range, and means coupled to said section of coaxial line for discriminating between said dominant and higher order mode energy.

7. A coaxial line frequency meter as set forth in claim 6, wherein said adjustable means comprises a probe extending into the interior of said section of coaxial line for producing $TE_{11}$ mode energy as said higher order mode, said probe being movable along the axis of said section between the ends thereof to different positions at which said coaxial line section is just above cut-off for said higher order mode at each frequency within said frequency band.

8. A coaxial line frequency meter as set forth in claim 7, wherein the depth of penetration of said probe into said section of coaxial line is a variable function of the distance thereof from said first end.

9. A coaxial line frequency meter as set forth in claim 6, wherein said adjustable means comprises a probe extending into the interior of said section of coaxial line for exciting $TE_{11}$ mode energy as said higher order mode, said probe being movable in a single plane longitudinally of said section of transmission line to a different position at which said coaxial line section is just above cut-off for said higher order mode for each frequency within said frequency band, said mode discriminating means comprising a further section of coaxial line coupled to the second end of the first-mentioned section, and longitudinal slot means located in one of the conductors of said further section in ninety degree orientation about the axis of said transmission line sections from the direction of extension of said probe.

10. A broad band frequency meter, comprising a first tapered section of coaxial transmission line for propagating dominant TEM mode electromagnetic input energy over a predetermined wide frequency range, said section having an outer conductor tapering from a narrow diameter at an input end thereto to a wide diameter at an output end therefor, a region adjacent said input end being just above cut-off for a higher order mode at the highest frequency within said frequency range with said output end being just above cut-off for said higher order mode at the lowest frequency within said range, means supported for axial adjustment along said tapered section for exciting said higher order mode whenever said means is at a position whereat said tapered section is above cut-off for said higher order mode at the frequency of said input energy, an intermediate section of coaxial transmission line coupled to the output end of said tapered section for propagation of said dominant mode energy and said higher order mode energy over said wide frequency range, means along said intermediate section for selectively attenuating said higher order mode energy, a further tapered section of coaxial transmission line coupled to the output of said intermediate section, said further section having an outer conductor tapering from a wide diameter matching that of the outer conductor of said intermediate section to a narrow diameter, and matched detector means terminating the output end of said further tapered section.

11. A broad band frequency meter as set forth in claim 10, further including an indicator in combination with said higher order mode exciting means and said first tapered section of coaxial line, said indicator being calibrated for providing information relative to the various positions for said mode exciting means corresponding to the various frequencies within said frequency range at which said first tapered section of coaxial line is just above cut-off therefor.

12. A broad band frequency meter as set forth in claim 11, wherein said higher order mode exciting means comprises a probe, and means for adjusting the depth of penetration of said probe into said first tapered section of coaxial line as a function of the axial position therealong.

References Cited in the file of this patent

UNITED STATES PATENTS

| | | |
|---|---|---|
| 2,180,950 | Bowen | Nov. 21, 1939 |
| 2,404,797 | Hansen | July 30, 1946 |
| 2,512,468 | Percival | June 20, 1950 |
| 2,572,232 | Wolfe | Oct. 23, 1951 |
| 2,642,494 | Zaslavsky | June 16, 1953 |
| 2,764,743 | Robertson | Sept. 25, 1956 |